United States Patent
Yang et al.

[11] Patent Number: 6,161,750
[45] Date of Patent: Dec. 19, 2000

[54] WELD TAB

[76] Inventors: Chien-Chang Yang, No. 80, Ho-Ping Lane, Hsieh-Ho Li, Kang-Shan Chen, Kaohsiung Hsien; Marlon Chen, No. 40, Lane 85, Chung-Tu St., Shan-Ming Dist., Kaohsiung, both of Taiwan

[21] Appl. No.: 09/370,679

[22] Filed: Aug. 9, 1999

[51] Int. Cl.$^7$ .................................................. B23K 37/06
[52] U.S. Cl. ............................................ 228/50; 228/215
[58] Field of Search ............................... 228/46, 50, 215, 228/222

[56] References Cited

U.S. PATENT DOCUMENTS

| | | | |
|---|---|---|---|
| 3,960,311 | 6/1976 | Griffiths | 228/49.3 |
| 4,182,951 | 1/1980 | Kuder | 219/160 |
| 4,295,593 | 10/1981 | Kensrue | 228/50 |
| 4,360,141 | 11/1982 | Kensrue | 228/46 |
| 4,850,524 | 7/1989 | Schick | 228/102 |

*Primary Examiner*—Samuel M. Heinrich
*Attorney, Agent, or Firm*—Thomas, Kayden, Horstemeyer & Risley LLP

[57] ABSTRACT

A weld tab has a tab which contains a circular groove therein. A metal stick is received in the circular groove. The tab has an end which has a snapping groove to receive a pad. The pad has two ends each received in the snapping groove of the tab.

8 Claims, 7 Drawing Sheets

WELD TAB

CROSS-REFERENCE TO RELATED APPLICATIONS

Not Applicable

BACKGROUND OF THE INVENTION

1. Field of the Invention

The present invention relates to a weld tab, and more particularly, to a weld tab containing a circular groove which has a slit.

2. Description of the Related Art

A conventional weld tab in accordance with the prior art shown in FIG. 7 comprises two tabs (83) and a clamping member (80) to clamp the tabs (83). The clamping member (80) has two magnetic devices (81) and two resilient flats (82) attached thereto. When the two parts (84; 85) are welded, a man must attach a horizontal stabilizer (not shown) behind a welding groove (841) by adhesive tape and puts the magnetic devices (81) of the clamping member (80) on the sides of the part (84). Then the tabs (83) are clamped by two resilient flats (82) and forms a closed weld (841) to prevent the welding material from running out from the two sides of the welding groove (841).

Although the clamping member (80) can clamp the tabs (83) against the two sides of the welding groove (841), in fact the resilient flat (82) of the clamping member (80) easily becomes fatigued and loses the elastic resilience when being used for a long time. Furthermore the welding of most large parts usually need to be repeated several times in order to make sure that the parts are securely welded. The tabs (83) are made of ceramic which can not be welded to iron. So the tabs (83) only have a side pressure from the resilient flat (82) of the clamping member (80) during welding. There is no stabilization or support device between the tabs (83) and the parts (84); (85) to prevent them from detaching except clamping member (80). So the tabs are not very convenient in use.

When using the weld tab, the welder normally attaches the tabs (83) to the side of the part (84) by a adhesive tape. Since the adhesive tape very easily detaches from the tabs (83) and the parts (84, 83) when it is at a high temperature, a welder must reattach the tape several times before finished. It is a big trouble in the manufacturing.

The present invention has arisen to mitigate and obviate the disadvantage of the conventional weld tabs.

BRIEF SUMMARY OF THE INVENTION

In accordance with one aspect of the present invention, a weld tab includes a tab having an inclined circular groove on side and a metal rod received in the groove. When the first welding pass is made, the weld metal is closed at the bottom of the welding groove and welds the metal rod. Then the metal rod provides a stabilization function to the tab which closes the weld when welding from one end to the other. So the prevent invention of the weld tab not only makes welding easier but also promotes the quality of welding.

Further benefits and advantages of the present invention will become apparent after a careful reading of the detailed description with appropriate reference to the accompanying drawings.

DETAILED DESCRIPTION OF THE INVENTION

Figure 1:
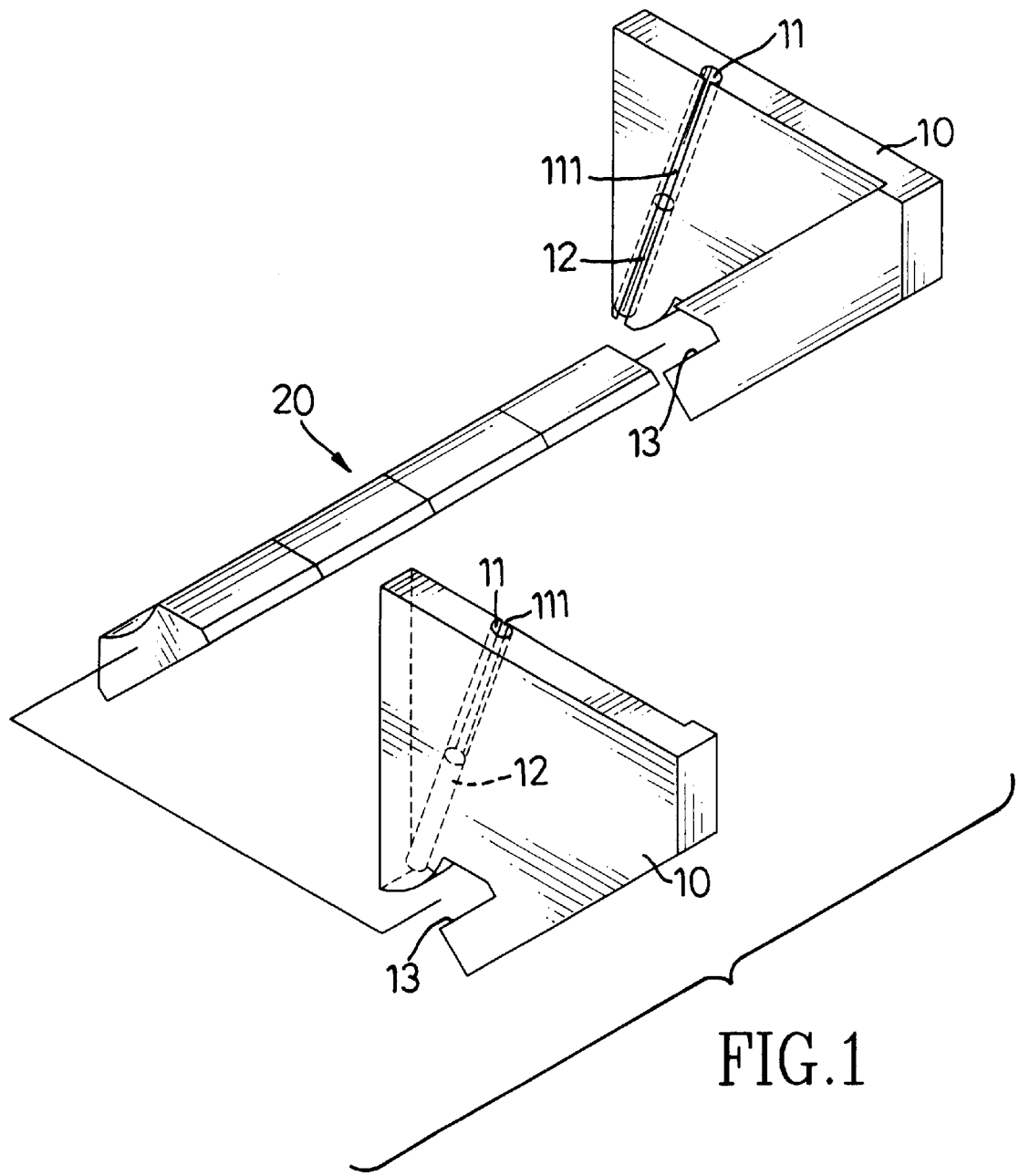
FIG. 1 is an exploded view of a weld tab in accordance with the present invention.
Figure 2:
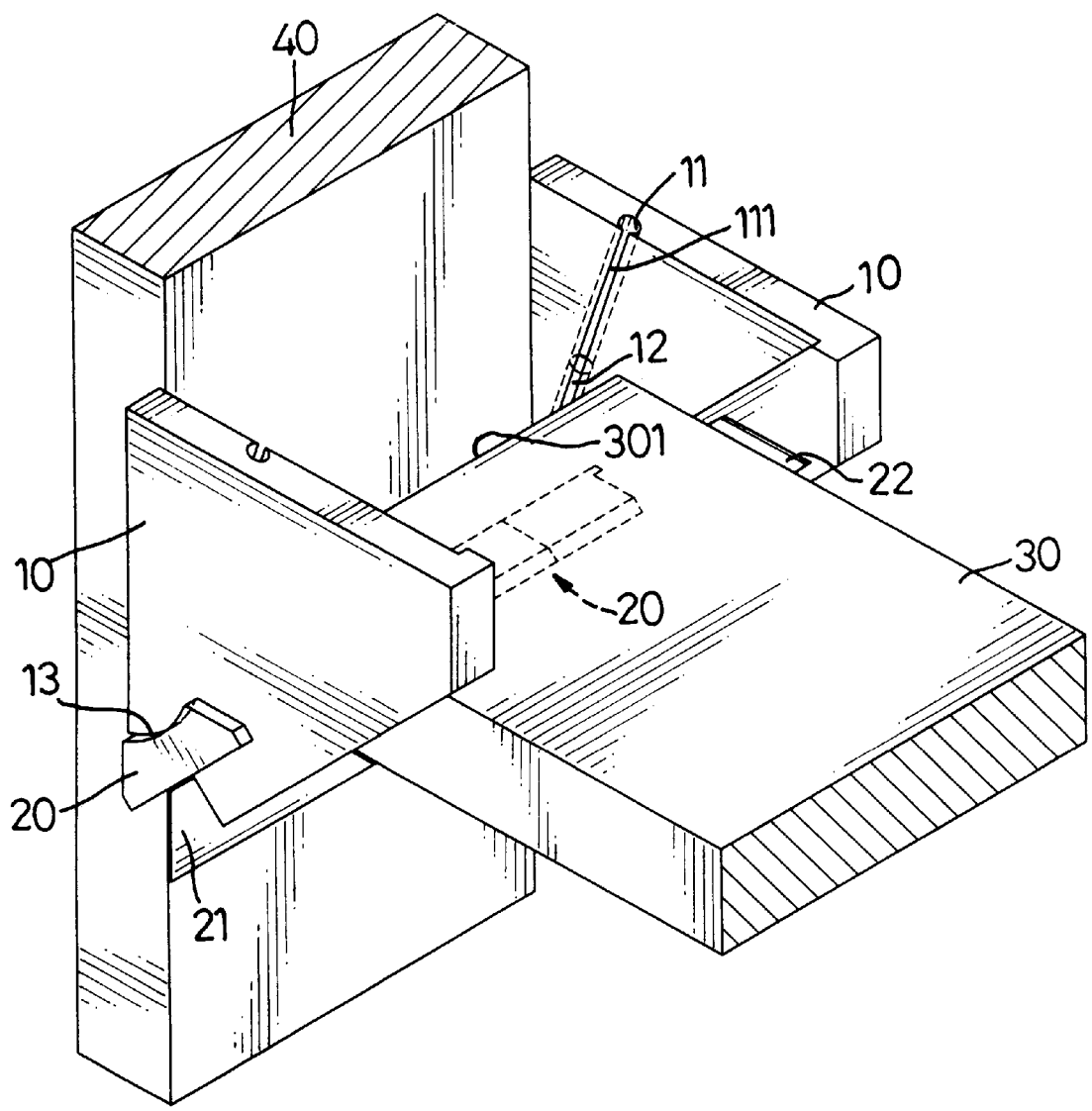
FIG. 2 is an operational perspective view of the weld tab in FIG. 1.

Referring now to the drawings and initially to FIGS. 1 and 2, a weld tab in accordance with the present invention comprises a tab (10) each containing a circular groove (11) and a clamping recess (13). The circular groove (11) contains a slit (11) and has a metal rod (12) received therein. The circular groove (11) is defined to align with a weld groove (301) when the tab (10) is positioned against the parts (30, 40) to be welded. The weld tab further includes a horizontal stabilizer groove (20) received in the clamping recess (13) of the tab (10).

Figure 3:
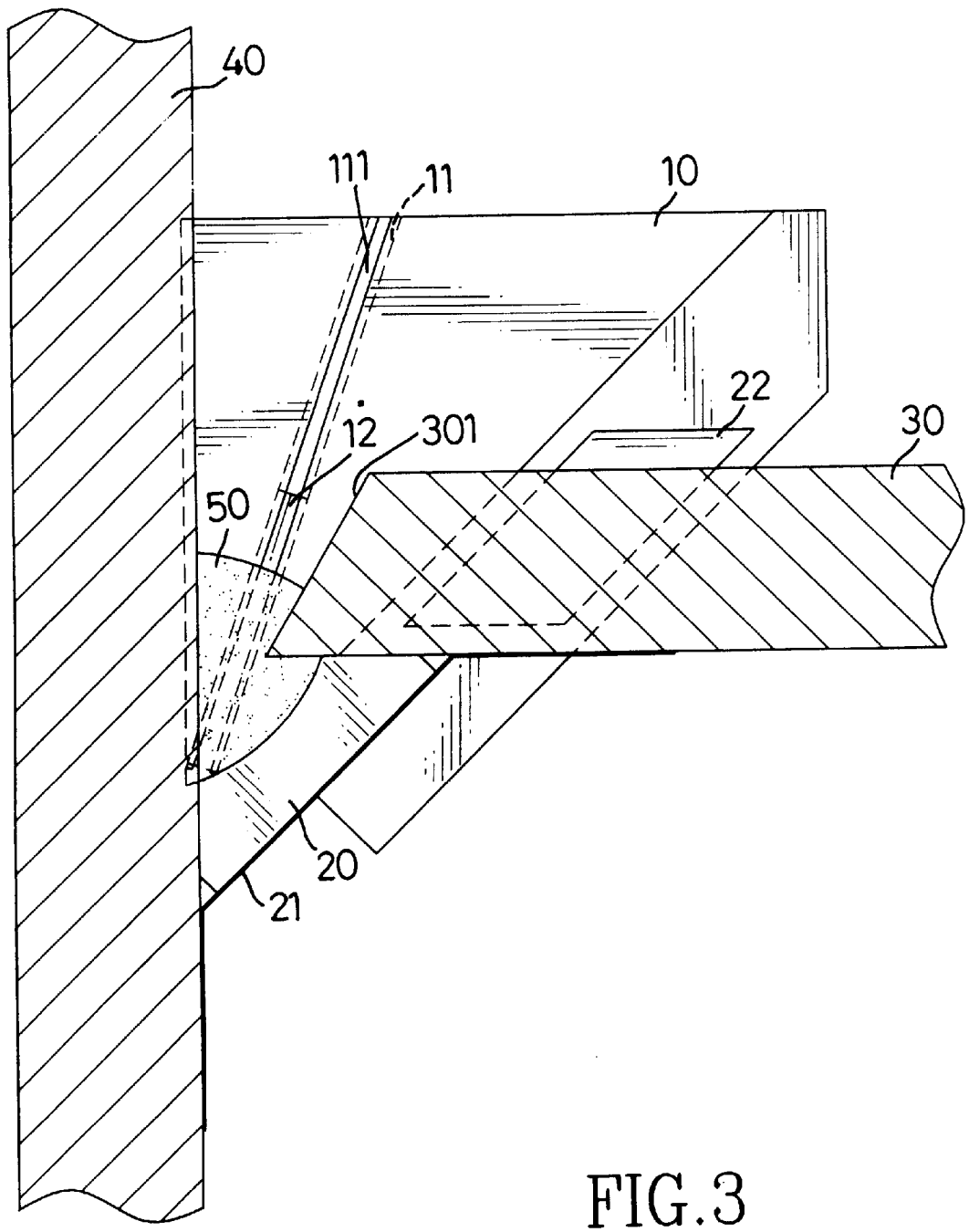
FIG. 3 is an operational cross-sectional side plan view of the weld tab in FIG. 2.

The horizontal stabilizer (20) abuts the bottom of the weld groove (301) of the parts (30, 40), and is held in position by adhesive tape (21). Referring to FIG. 3, the clamping recess (13) of the tab (10) receives one end of the horizontal stabilizer (20) to align the circular groove (11) at the end of the weld groove (301). The tab (10) is attached to the part (30) to be welded by two-sided adhesive (22) to hold the tab (10) in place when starting to weld.

When starting to weld the metal rod (12) received in the circular groove (11) is bonded with the welding filler (50) in the weld groove (301) to firmly hold against the tab (10) against the sides of the parts (30, 40) being welded and the end of the weld groove (301). Then, even if the adhesive tape (21) detaches from the horizontal stabilizer (20) or the metal rod (12) in the tab (10) bonded to the welding filler (50) at the bottom of the welding groove (301) will firmly hold the tabs 10) and horizontal stabilizer (20) in place.

Figure 4:
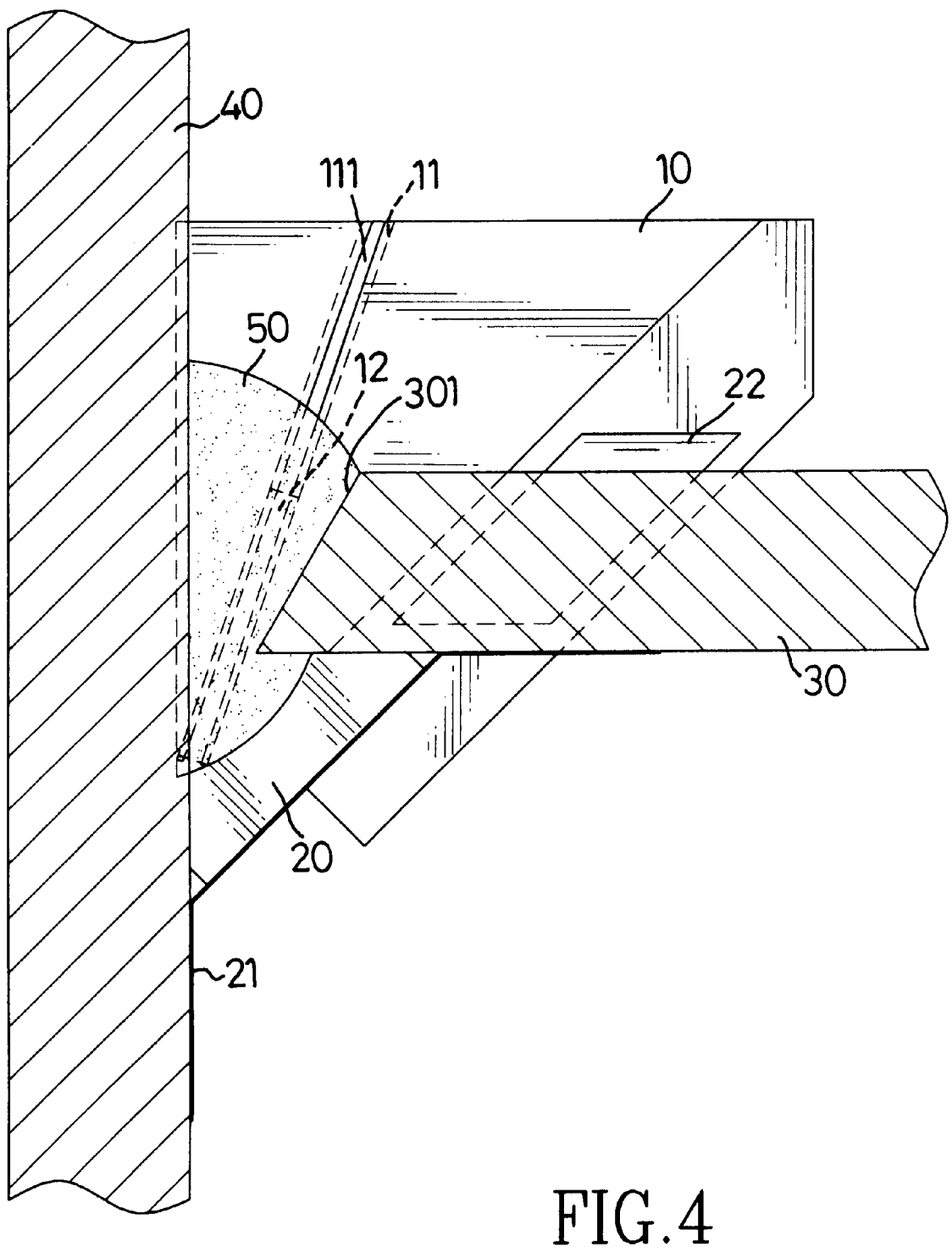
FIG. 4 is an operational cross-sectional side plan view of the weld tab in FIG. 3 when the welding is finished.

Referring to FIG. 4, the tab (10) still securely closes the two ends of the weld groove (301) to prevent the welding filler (50) from leaking until the weld is finished. The tab (10) is released from the parts (30, 40) when the metal rod (12) is entirely melted and flows into the weld groove (301), or when the slit (111) of the circular groove (11) is gradually broken along the complete length of the metal rod (12) due to the high temperature of repeated welding.

The metal rod (12) is the same material as of the welding filler (50), so they are melted and combined by the high temperature of the welding process. The length of the metal rod (12) in the circular groove (11) is shorter than the thickness of the part (30). The length of the metal rod (12) is determined based on the thickness of the parts (30) in order to be melted and combined with the welding filler (50) in the weld in the welding process, consequently, the weld tab does not influence the shape of the weld and has a good consistency.

Figure 5:
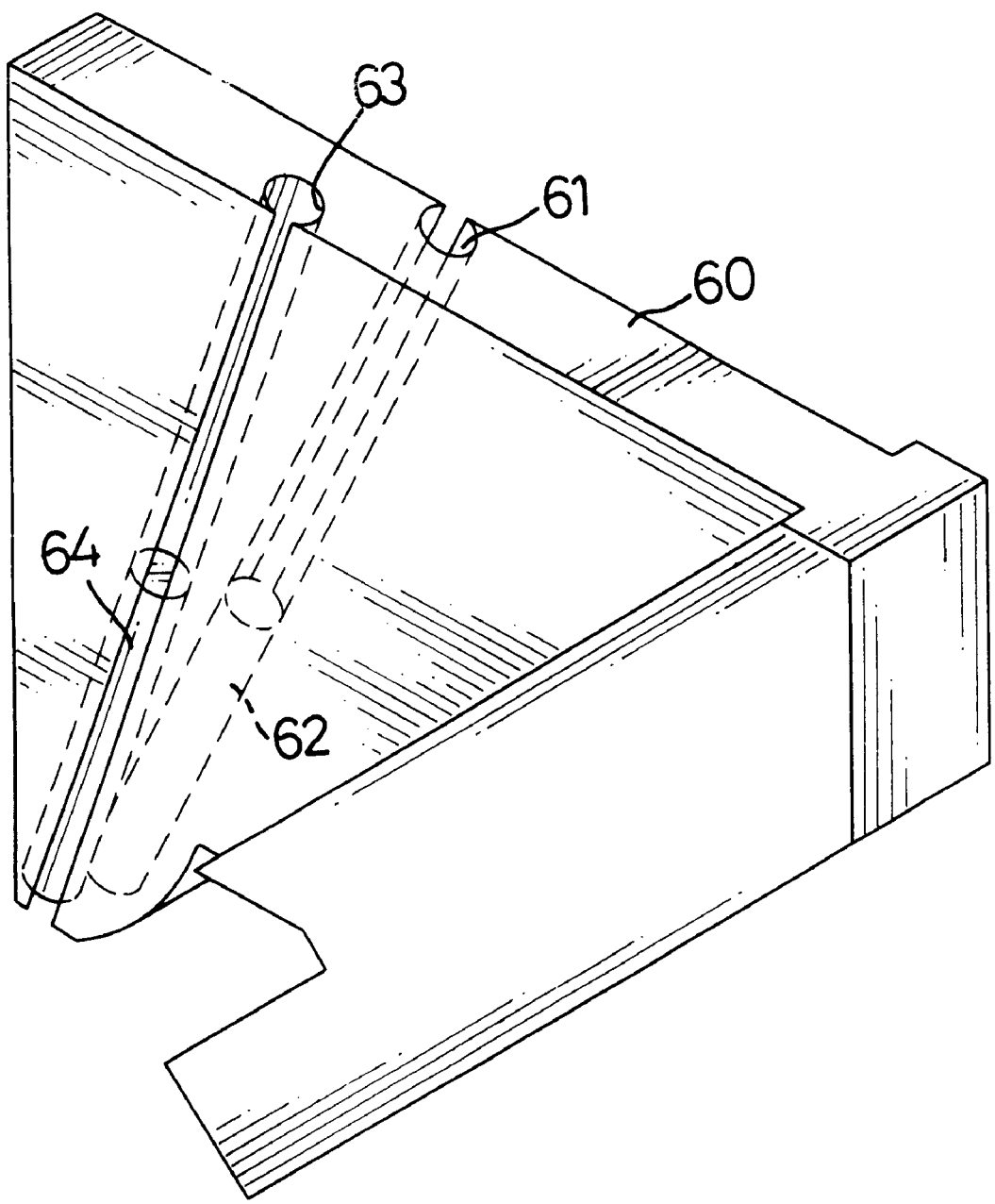
FIG. 5 is a perspective view of a second embodiment of the weld tab in accordance with the present invention.

Referring to FIG. 5, it is a second embodiment of the present invention. The tab (60) has two sides each having a circular groove (61, 63) and receiving a metal rod (62, 64). Then user can effectively use the tab (60) twice by using it on the other end during the second use.

Figure 6:
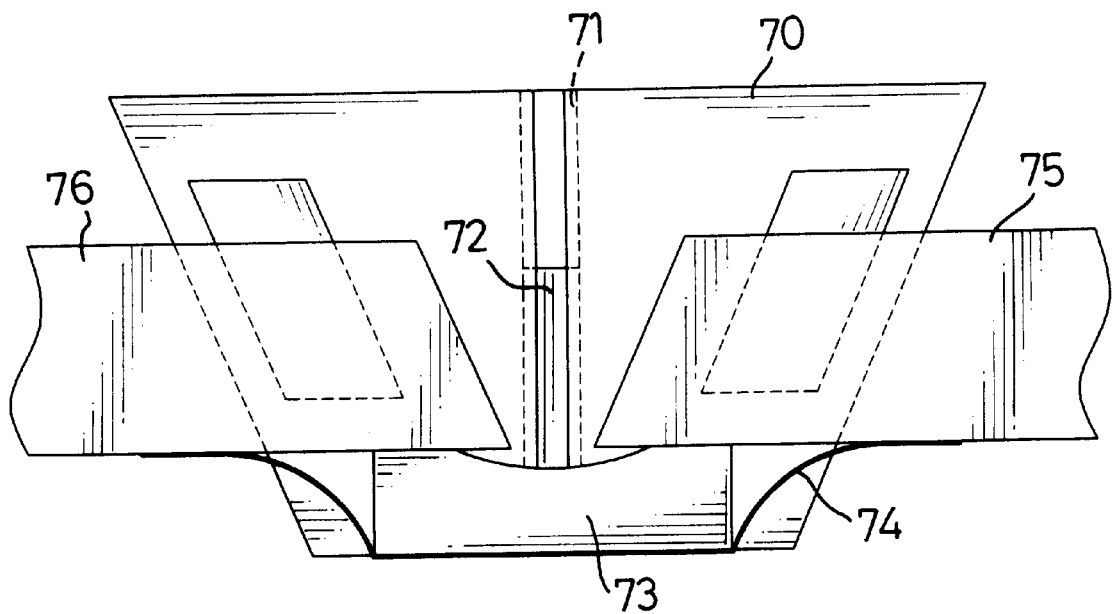
FIG. 6 is an operational side plan view of a third embodiment of the weld tab in accordance with the present invention used to join two flat plates in a single plane.
Figure 7:
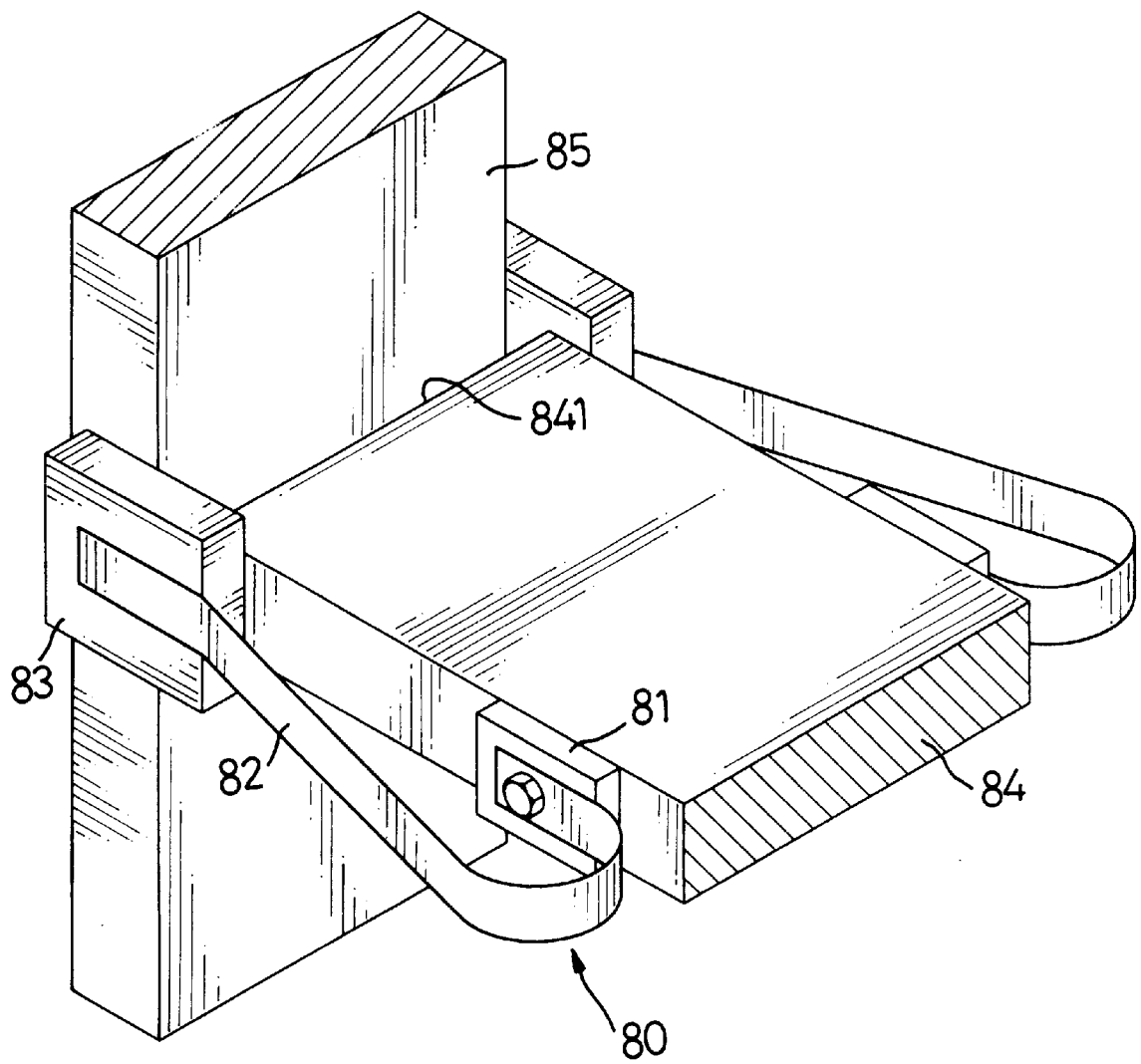
FIG. 7 is an operational perspective view of a conventional weld tab in accordance with the prior art.

Referring to FIG. 6, it is an another type of the present invention which is used to weld two parallel parts (75, 76) in a flat plane. The tab (70) has a side containing a circular groove (71) receiving a metal rod (72) therein and use the weldable metal rod (72) to hold the tab (70) in place. The horizontal stabilizer (73) is attached to the bottom of the two parts (75, 76) by adhesive tape (74) to make the welding process easier.

Although the invention has been explained in relation to its preferred embodiment, it is to be understood that many other possible modification and variation can be made without departing from the spirit and scope of the invention as hereinafter claimed.

What is claimed is:

1. A weld tab comprising:

two tabs each having a first side, a second side, a first end and a second end;

a circular groove defined in said tab and extending from said first end to a said second end;

a slit defined in one side of said tab and communicating with said circular groove;

a horizontal stabilizer having a first end and a second end respectively received in said two tabs.

2. The weld tab in accordance with claim 1, wherein said first end of said two tabs each contains a clamping recess respectively receiving said first end and said second end of said horizontal stabilizer therein.

3. The weld tab in accordance with the claim 1, wherein said slit is defined in said first side of said tab.

4. The weld tab in accordance with claim 1, wherein said slit is defined in said second side of said tab.

5. A weld tab comprising:

a tab having a first side, a second side, a first end and a second end;

a circular groove defined in said tab and extending from said first end to said second end of said tab, a slit defined in one side of said tab and communicating with said circular groove; and a metal rod received in said circular groove.

6. The weld tab in accordance with claim 5, wherein said first end of said tab contains a clamping recess to receive a horizontal stabilizer therein.

7. The weld tab in accordance with claim 5, wherein said slit is defined in said first side of said tab.

8. The weld tab in accordance with claim 5, wherein said slit is defined in said second side of said tab.

* * * * *